US010499406B1

(12) United States Patent
Marupaduga et al.

(10) Patent No.: US 10,499,406 B1
(45) Date of Patent: *Dec. 3, 2019

(54) ASSIGNING A FRAME CONFIGURATION IN A RELAY ENABLED COMMUNICATION NETWORK

(71) Applicant: Sprint Spectrum LP, Overland Park, KS (US)

(72) Inventors: Sreekar Marupaduga, Overland Park, KS (US); John Prock, Raymore, MO (US); Maneesh Gauba, Overland Park, KS (US); Gene S. Mitchell, Blue Springs, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 49 days.

This patent is subject to a terminal disclaimer.

(21) Appl. No.: 15/856,746

(22) Filed: Dec. 28, 2017

Related U.S. Application Data

(63) Continuation of application No. 14/838,549, filed on Aug. 28, 2015, now Pat. No. 9,913,283.

(51) Int. Cl.
| | |
|---|---|
| *H04W 72/08* | (2009.01) |
| *H04W 72/04* | (2009.01) |
| *H04B 7/14* | (2006.01) |
| *H04W 24/02* | (2009.01) |
| *H04W 24/08* | (2009.01) |
| *H04W 88/08* | (2009.01) |

(52) U.S. Cl.
CPC ............ *H04W 72/085* (2013.01); *H04B 7/14* (2013.01); *H04W 24/02* (2013.01); *H04W 72/0406* (2013.01); *H04W 24/08* (2013.01); *H04W 88/08* (2013.01)

(58) Field of Classification Search
None
See application file for complete search history.

(56) References Cited

U.S. PATENT DOCUMENTS

| | | | |
|---|---|---|---|
| 9,913,283 B1 * | 3/2018 | Marupaduga | ....... H04W 72/085 |
| 2011/0216675 A1 | 9/2011 | Li et al. | |
| 2014/0119237 A1 | 5/2014 | Gan et al. | |
| 2014/0177460 A1 | 6/2014 | Keskkula et al. | |
| 2014/0198680 A1 | 7/2014 | Siomina et al. | |
| 2014/0307591 A1 * | 10/2014 | Wang | ................. H04W 72/1231 |
| | | | 370/278 |
| 2015/0250017 A1 | 9/2015 | Ingale et al. | |
| 2015/0341248 A1 | 11/2015 | Deng et al. | |
| 2016/0183271 A1 * | 6/2016 | Zhou | .................... H04B 17/309 |
| | | | 370/315 |
| 2016/0261503 A1 | 9/2016 | Burgess et al. | |
| 2016/0345281 A1 * | 11/2016 | Murray | ............. H04W 56/0045 |

* cited by examiner

*Primary Examiner* — Mohamed A Kamara
*Assistant Examiner* — Saad Khawar

(57) ABSTRACT

A frame configuration is assigned in a relay enabled communication network. A macro coverage latency is determined. The macro coverage latency is a latency of a communication between the wireless device and a network node when the wireless device is not communicating through the relay node. A relay coverage latency is determined. The relay coverage latency is a latency of a communication between the wireless device and the network node when the wireless device is communicating through the relay node. Based on a comparison of the macro coverage latency and the relay coverage latency, a frame configuration is selected for a communication through the relay node.

20 Claims, 4 Drawing Sheets

| CONFIG NUMBER | D/U SWITCH PERIODICITY | SUBFRAME NUMBER | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

300

ASSIGNING A FRAME CONFIGURATION IN A RELAY ENABLED COMMUNICATION NETWORK

This patent application is a continuation of U.S. patent application Ser. No. 14/838,549, filed on Aug. 28, 2015, which is incorporated by reference in its entirety for all purposes.

TECHNICAL BACKGROUND

Telecommunication systems, such as cellular networks or other wireless networks, may provide a plurality of cells that a wireless device may use to communicate with a network. In a relay enabled communication network, the cells may be provided by an access node, which is typically referred to as a macro node, and a relay node. The relay node is in wireless communication with the access node and serves as a relaying device for the access node. A wireless device communicates with the access node through the relay node.

Relay enabled communication networks can improve the coverage area and resources for wireless devices without the expenses associated with an additional access node. For example, the relay node in communication with the access node can provide coverage in an area that is not covered by the access node. However, latency of a communication through the relay node may be greater than a latency of a communication when the wireless device is communicating directly with the access node. In other words, a communication, such as transmitting data packet through the relay node to the access node, can take longer than communicating directly with the access node.

OVERVIEW

In an embodiment, a method for assigning a frame configuration in a relay enabled communication network is provided. The method comprises determining a macro coverage latency between a wireless device and a network node when the wireless device is not communicating through a relay node, the macro coverage latency being based on a first sounding reference signal transmitted from the wireless device and received at the network node, determining a relay coverage latency between the wireless device and the network node when the wireless device is communicating through a relay node, the relay coverage latency being based on a second sounding reference signal transmitted from the wireless device and received at the network node via the relay node and, based on a comparison of the macro coverage latency and the relay coverage latency, selecting a frame configuration for a communication through the relay node.

In an embodiment, a processing node for assigning a frame configuration in a relay enabled communication network is provided. The processing node comprises a processor that enables the processing node to perform operations comprising determining a macro coverage latency between a wireless device and a network node when the wireless device is not communicating through a relay node, the macro coverage latency being based on a first sounding reference signal transmitted from the wireless device and received at the network node, determining a relay coverage latency between the wireless device and the network node when the wireless device is communicating through a relay node, the relay coverage latency being based on a second sounding reference signal transmitted from the wireless device and received at the network node via the relay node and, based on a comparison of the macro coverage latency and the relay coverage latency, selecting a frame configuration for a communication through the relay node.

DETAILED DESCRIPTION

The various exemplary embodiments described herein contemplate methods and systems for assigning a frame configuration in a relay enabled communication network. A relay enabled communication network includes a network node (e.g., access node) that is in communication with a wireless device via a relay node. In a relay enabled network, a relay coverage latency may be different than a macro coverage latency, which is the latency of a communication that does not employ the relay node. The difference between the macro and relay coverage latencies can exist in a downlink or uplink portion of the communication link between a relay node and a wireless device.

Frame configurations differ by uplink and downlink subframe configurations. For example, one frame configuration may have more downlink subframes than uplink subframes whereas a different frame configuration may have equal numbers of downlink and uplink subframes. Accordingly, if the difference in the macro and relay coverage latencies is due to the downlink portion of the communication, then a frame configuration with more downlink subframes than uplink subframes may be chosen to reduce the relay coverage latency.

Figure 1:
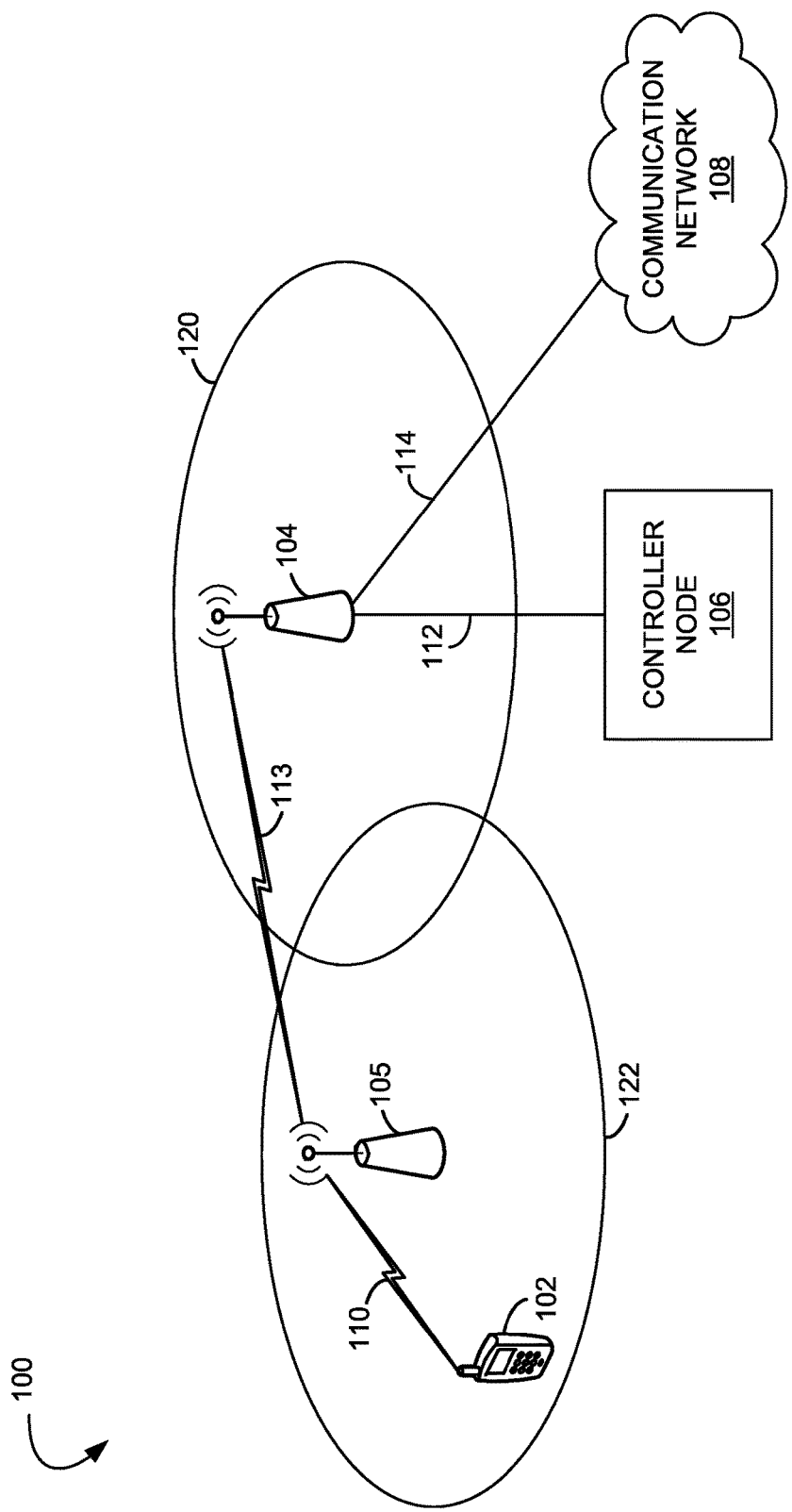
FIG. 1 illustrates an exemplary system for assigning a frame configuration in a relay enabled communication network.

FIG. 1 illustrates an exemplary system 100 for assigning a frame configuration in a relay enabled communication network. Communication system 100 is a network that can provide wireless communication to wireless device 102. Communication network 108 is a network that can provide communication between access node 104 and other wired or wireless networks. Communication system 100 can comprise wired and/or wireless communication networks that include processing nodes, routers, gateways, physical and/or wireless data links for carrying data among various network elements, including combinations thereof, and can include a local area network, a wide area network, and an internetwork (including the Internet). Communication system 100 can also comprise wireless networks, including base station, wireless communication nodes, telephony switches, internet routers, network gateways, computer systems, communication links, or some other type of communication equipment, and combinations thereof.

Wireless device 102 can be any device configured to communicate over communication system 100 using a wireless interface. For example, wireless device 102 can include a remote terminal unit, a cell phone, a smart phone, a computing platform such as a laptop, palmtop, or a tablet, a personal digital assistant, or an internet access device, and combinations thereof. It is noted that while one wireless device 102 is illustrated in FIG. 1 as being in communication with access node 104 through relay node 105, any number of wireless devices can be implemented according to various exemplary embodiments disclosed herein. Access node 104 has corresponding macro coverage 120. Wireless device 102 is in relay coverage area 122 provided by relay node 105, but may have previously been in macro coverage area 120.

The wireless interface of wireless device 102 can include one or more transceivers for transmitting and receiving data over communication system 100. Each transceiver can be associated with a different frequency band, the same or different radio access technologies, and/or the same or different network providers. For example, wireless device 102 can include a transceiver associated with at least one wireless cellular protocol and/or other types of wireless communication. For example, a transceiver can be associated with code division multiple access (CDMA), global system for mobile communications (GSM), worldwide interoperability for microwave access (WiMAX), long-term evolution (LTE), and/or high-speed downlink packet access (HSDPA), IEEE 802.11, wireless fidelity (WiFi), Bluetooth, Zigbee, infrared data association (IrDA), etc.

Wireless device 102 can be in communication with access node 104 or relay node 105 through communication link 110 and/or relay link 113. Links 110, 113 can use various communication media, such as air, space, metal, optical fiber, or some other signal propagation path—including combinations thereof. Links 110, 113 may comprise many different signals sharing the same link. Links 110, 113 could include multiple signals operating in a single "airpath" comprising beacon signals, user communications, communication sessions, overhead communications, frequencies, timeslots, transportation ports, logical transportation links, network sockets, packets, or communication directions. For example, user communications between wireless device 102 and access node 104 could share the same representative wireless link, but be transferred over different communication sessions, frequencies, timeslots, packets, ports, sockets, logical transport links, or in different directions—including combinations thereof.

Communication links 110, 113 are wireless links that use various communication protocols such as, for example, Internet, Internet protocol (IP), local-area network (LAN), optical networking, hybrid fiber coax (HFC), telephony, T1, or some other communication format, including combinations, improvements, or variations thereof. Although links 110, 113 are depicted between only wireless device 102 and relay node 105, any wireless device may be linked to access node 104 and/or relay node 105 via a communication link. According to an exemplary embodiment, wireless communication links can be, for example, a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used than those specified in the various exemplary embodiments described herein. Links 110, 113 can be a direct link or may include various equipment, intermediate components, systems, and networks, according to an exemplary embodiment.

In an embodiment, links 110, 113 operate on different frequencies. In this configuration, intercell interference may be avoided between access node 104 and relay node 105 transmissions. In some examples, the frequency for link 110 may operate in the higher frequency range of a band class while link 110 would operate in a higher frequency range of a band class. A band class may be defined as a set of frequencies or carriers that exist in a particular set of wireless spectrum.

Wireless device 102 can communicate information over system 100 using various communication services. These services can include various voice and/or data services and applications. For example, mobile voice services, mobile data services, push-to-talk services, internet services, web browsing, email, pictures, picture messaging, video, video messaging, audio, voicemail, music, MP3's, ring tones, stock tickers, new alerts, etc.

Access node 104 can be any network node configured to provide communication between wireless device 102 and communication network 108. For example, access node 104 can be selected from a base transceiver station, a radio base station, an eNodeB device, or an enhanced eNodeB device, or the like. It is noted that while only one access node 104 is illustrated in FIG. 1, any number of access nodes can be implemented within system 100.

Access node 104 can comprise a processor and associated circuitry to execute or direct the execution of computer-readable instructions to obtain information. Access node 104 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Access node 104 can receive instructions and other input at a user interface.

Relay node 105 may be any device, system, combination of devices, or other such communication platform capable of communicating with access node 104. In an embodiment, relay node 105 can be configured to function as a relay on behalf of access node 104. In an embodiment, relay node 105 can be configured to function as one or more of a layer 1 (L1), layer 2 (L2), or layer 3 (L3) relay. A layer 1 relay functions as a booster or repeater. In other words, a layer 1 relay device performs an amplify and forward (AF) function. RF signals received from access node 104 are amplified and transmitted by the relaying device. Likewise, RF signals received from the wireless device 102 are amplified and transmitted by the relay node 105 to access node 104.

A layer 2 relay device performs a decode and forward (DF) function. RF signals received from access node 104 are demodulated and decoded, then encoded and modulated again before being transmitted by the relay node 105 to the wireless device 102. Likewise, RF signals received from the wireless device are demodulated and decoded, then encoded and modulated again before being transmitted by the relay node 105 to access node 104.

A layer 3 relay device also performs a decode and forward function. However, a layer 3 relay device also performs additional processing (such as ciphering and/or data concatenation/segmentation/reassembly). In other words, the relay node 105 performs demodulation and decoding of the received RF signals (either uplink or downlink), processes received data, then encodes, modulates, and transmits the data to the device(s) whose transmission is being relayed.

Access node 104 and relay node 105 have associated macro and relay coverage areas 120, 122. The macro coverage area 120 is associated with the access node 104. When the wireless device 102 is in the macro coverage area 120, the wireless device 102 communicates directly with the access node 104 through a wireless communication link.

That is, the wireless device 104 does not communicate through the relay node 105. When the wireless device 102 is in the relay coverage area 122, the wireless device 102 communicates with the access node 104 through the relay node 105. Accordingly, the access node 104 and the relay node 105 enable the wireless device 102 to communicate with the communication network 108 over a larger coverage area.

Controller node 106 can be any network node configured to communicate information or control information over system 100. Controller node 106 can be a standalone computing device, computing system, or network component, and can be accessible, for example, by a wired or wireless connection, or through an indirect connection such as through a computer network or communication network. For example, controller node 106 can include a mobility management entity (MME), a serving gateway (SGW), a public data network gateway (PGW), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 106 is not limited to any specific technology architecture, such as Long Term Evolution (LTE) and can be used with any network architecture and/or protocol.

Controller node 106 can comprise a processor and associated circuitry to execute or direct the execution of computer-readable instructions to obtain information. Controller node 106 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Controller node 106 can receive instructions and other input at a user interface.

Controller node 106 can be in communication with access node 104 through communication link 112. Access node 104 can be in communication with communication network 108 through communication link 114. Communication links 112, 114 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Other wireless protocols can also be used. Communication links 112, 114 can be a direct link or might include various equipment, intermediate components, systems, and networks.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet), according to an exemplary embodiment.

Communication network 108 can be capable of carrying data, for example, to support voice, push-to-talk, broadcast video, and data communications by a wireless device, such as wireless devices 102. Wireless network protocols can comprise, for example, code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 108 comprise, for example, Ethernet, Fast Ethernet, Gigabit Ethernet, Local Talk (such as Carrier Sense multiple Access with Collision Avoidance), Token Ring, Fiber Distributed Data Interface (FDDI), and Asynchronous Transfer Mode (ATM). According to an exemplary embodiment, communication network 108 can also comprise additional base stations, controller nodes, telephony switches, internet routers, network gateways, computer systems, communication links, or other types of communication equipment, and combinations thereof.

Latency is a time between a transmission and receipt of a communication between nodes in the communication system 100. For example, latency could be the average time between a transmission of a data packet and a reception of an acknowledgment of the transmission. The data packet could be transmitted from the access node 104 to the wireless device 102. The wireless device 102 could send an acknowledgment, such as a hybrid automatic repeat request (HARD) ACK/NACK, which is received by the access node 104. The relay node 105 as well as other network nodes may also send the data packet and/or acknowledgement, such as a gateway node, controller node, etc., in the communication system 100. The access node 104 can determine the time difference between the transmission of the data packet and the receipt of the acknowledgment. The time difference can also be measured on the downlink or uplink portion of a communication. The latency can be used to assign a frame configuration in a relay enabled communication network, as the following will explain.

Latency may also be measured by access node 104 requesting wireless device 102 to send a sounding reference signal (SRS) to determine the latency on the uplink communication links either via relay node 105 and/or the latency via a direct link to access node 104 depending on the existing connection wireless device 102 has to the network. As would be understood, greater latency is to be expected in the uplink due to greater processing required at relay node 105 and/or access node 104 as traffic comes in from wireless device 105.

Figure 2:
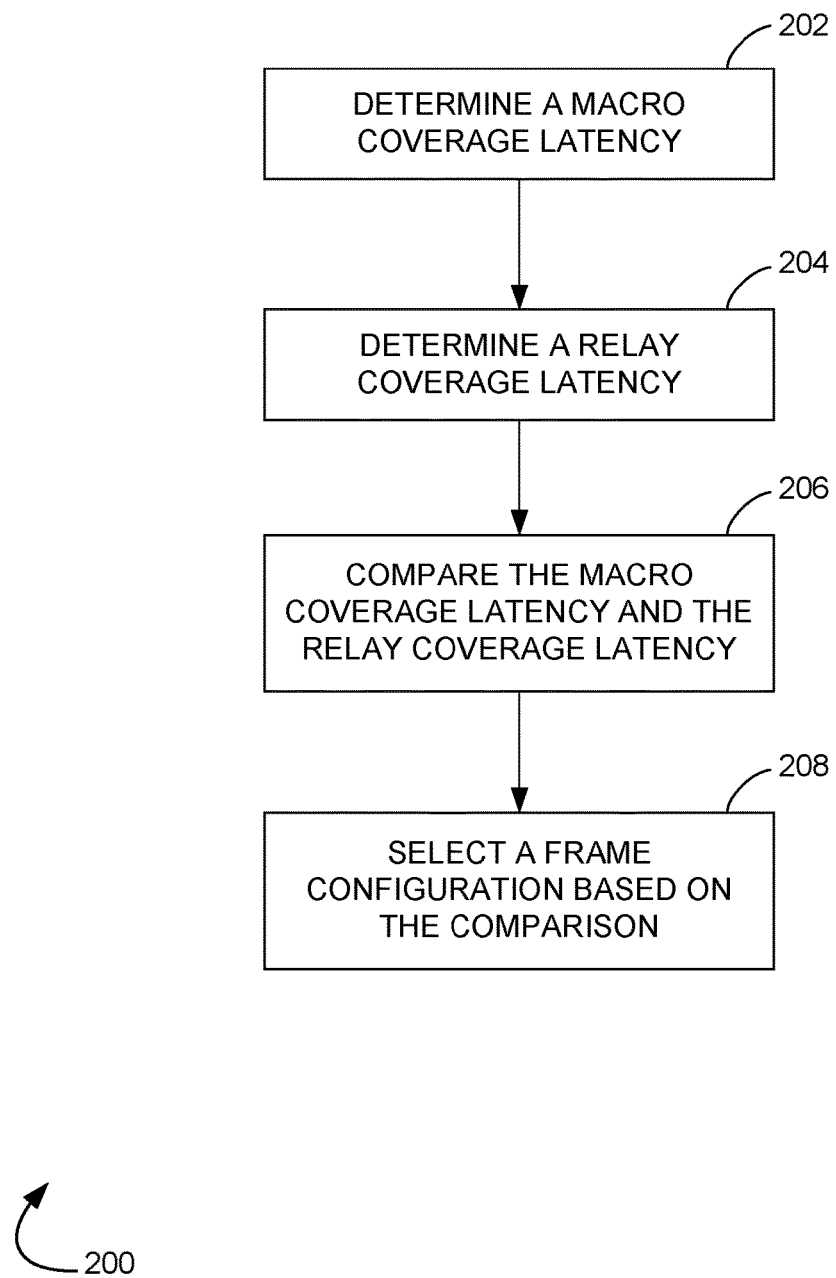
FIG. 2 shows a method for assigning a frame configuration in a relay enabled communication network.

FIG. 2 shows a method 200 for assigning a frame configuration in a relay enabled communication network. At step 202, a macro coverage latency is determined. The macro coverage latency is a latency of a communication between the wireless device 102 and a network node when the wireless device 102 is not communicating through the relay node 105. For example, the wireless device 102 could be in communication with the access node 104. The macro latency is the time required to transmit and/or receive a communication between the wireless device 102 and the access node 104 when the communication does not go through the relay node 105.

At step 204, a relay coverage latency is determined. The relay coverage latency is a latency of a communication between the wireless device 102 and a network node when the relay node 105 is employed. For example, the communication may be between the wireless device 102 and the access node 104 via the relay node 105. The communication can be a data packet sent by the access node 104 and an HARQ ACK/NACK response sent by the wireless device 102. The macro and relay coverage latencies, whether through the relay node 105 or not, may be measured by determining a difference in time that the packet is sent and the HARQ ACK/NACK is received. The macro and relay coverage latencies may be measured for the uplink and downlink portion of the communication.

At step 206, the macro coverage latency and the relay coverage latency are compared. The comparison may indicate that the macro coverage latency and the relay coverage latency are substantially the same or if the relay coverage latency is greater than the macro coverage. The relay coverage latency in the uplink or downlink portions may also be determined. For example, the time required to transmit a data packet from the wireless device 102 to a network node may be measured to determine the uplink latency. The time required to send an acknowledgment from the network node to the wireless device 102 may be measured to determine the downlink latency.

At step 208, a frame configuration may be selected based on the comparison. For example, if the macro and relay coverage latencies are substantially the same, the frame configuration selected for the relay coverage 122 may be the same as the frame configuration for the macro coverage 120. If the relay coverage latency is greater than the macro coverage latency, then a frame configuration may be selected to reduce the relay coverage latency. The selected frame configuration may be based on whether the latency is in the uplink or downlink portion of the communication link.

Figure 3:
FIG. 3 illustrates different frame configurations that may be selected in a relay enabled communication network.

FIG. 3 illustrates different frame configurations that may be selected in a relay enabled communication network. Table 300 is shown with seven frame configurations having different uplink and downlink reserved subframes. The frame configurations listed in table 300 are used in an LTE network for a time division duplex (TDD) communication link between the wireless device 102 and the access node 104 or the relay node 105. However, alternative frame configurations and/or networks may be employed in other embodiments.

An initial frame configuration for communicating through the relay node 105 may be the same frame configuration for when the wireless device 102 is in the macro coverage area 120. For example, the frame configuration for both the relay coverage and the macro coverage may be frame configuration 1 listed in table 400. Frame configuration 1 has equal numbers of uplink and downlink subframes. However, the initial frame configuration may also have different numbers of subframes, such as frame configuration 2, which has more downlink subframes than uplink subframes.

A frame configuration may be selected after measuring latency of a communication between the wireless device 102 and the access node 104 through the relay node 105. The selected frame configuration may be the same frame configuration already being utilized, such as the frame configuration 1, if the macro and relay coverage latencies are substantially the same. If the relay coverage latency is greater than the macro coverage latency, then a frame configuration may be selected to reduce the relay coverage latency.

When the relay coverage latency is measured, latency in the downlink portion of the communication may be measured to determine if the difference between the macro and relay coverage latencies are in the downlink portion of the communication. That is, the measurement may determine if the downlink portion of the relay coverage latency is greater than the downlink portion of the macro coverage latency. The selected frame configuration can increase the number of downlink subframes relative to the frame configuration employed when the macro and relay coverage latencies are measured. Increasing the number of downlink subframes can reduce the latency in the downlink portion of the communication.

The selected frame configuration may also ensure that the number of downlink and uplink subframes are equal. A frame configuration with equal numbers of downlink and uplink subframes may be employed if the difference between the relay and macro coverage latencies is in the uplink portion of the communication. Selecting a frame configuration with the same number of uplink and downlink subframes may increase the number of uplink subframes relative to a subframe configuration with more downlink subframes than uplink subframes.

Figure 4:
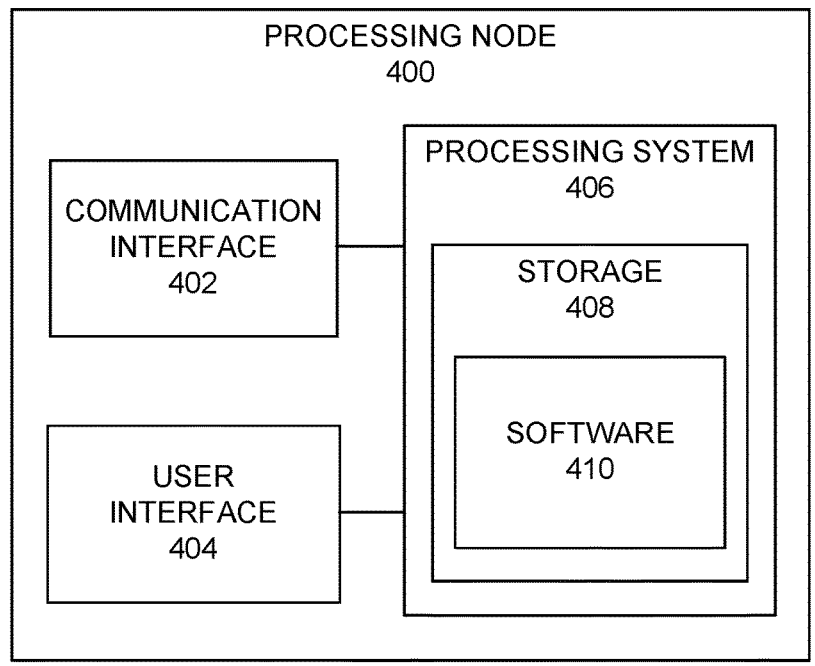
FIG. 4 illustrates an exemplary processing node comprising communication interface, user interface, and processing system in communication with communication interface and user interface.

FIG. 4 illustrates an exemplary processing node 400 comprising communication interface 402, user interface 404, and processing system 406 in communication with communication interface 402 and user interface 404. Processing node 400 is capable of paging a wireless device. Processing system 406 includes storage 408, which can comprise a disk drive, flash drive, memory circuitry, or other memory device. Storage 408 can store software 410 which is used in the operation of the processing node 400. Storage 408 may include a disk drive, flash drive, data storage circuitry, or some other memory apparatus. Software 410 may include computer programs, firmware, or some other form of machine-readable instructions, including an operating system, utilities, drivers, network interfaces, applications, or some other type of software. Processing system 406 may include a microprocessor and other circuitry to retrieve and execute software 410 from storage 408. Processing node 400 may further include other components such as a power management unit, a control interface unit, etc., which are omitted for clarity. Communication interface 402 permits processing node 400 to communicate with other network elements. User interface 404 permits the configuration and control of the operation of processing node 400.

An example of processing node 400 includes access node 104, controller node 106, communication network 108, and/or wireless device 102. Processing node 400 can also be an adjunct or component of a network element, such as an element of access node 104, relay node 105, controller node 106, communication network 108, wireless device 102, a mobility management entity, a gateway, a proxy node, or another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for assigning a frame configuration in a relay enabled communication network, the method comprising:
    determining a macro coverage latency between a wireless device and a network node when the wireless device is not communicating through a relay node, the macro coverage latency being based on a first sounding reference signal transmitted from the wireless device and received at the network node;
    determining a relay coverage latency between the wireless device and the network node when the wireless device is communicating through a relay node, the relay coverage latency being based on a second sounding reference signal transmitted from the wireless device and received at the network node via the relay node; and
    based on a comparison of the macro coverage latency and the relay coverage latency, selecting a frame configuration for a communication through the relay node.

2. The method of claim 1, wherein:
    the macro coverage latency is further based on a first average time between transmission of data packets from the network node directly to the wireless device and reception of acknowledgement of the transmission of the data packets, and
    the relay coverage latency is further based on a second average time between transmission of data packets from the network node to the wireless device via the relay node and reception of acknowledgement of the transmission of the data packets.

3. The method of claim 1, wherein the comparison of the macro coverage latency and the relay coverage latency comprises determining if the macro coverage latency is the same as the relay coverage latency.

4. The method of claim 3, wherein selecting the frame configuration comprises selecting a frame configuration that is the same as a frame configuration employed in a communication without the relay node.

5. The method of claim 1, wherein the comparison between the macro coverage latency and the relay coverage latency comprises determining if the relay coverage latency is higher than the macro coverage latency.

6. The method of claim 5, further comprising determining if the relay coverage latency is higher than the macro coverage latency due to the second sounding reference signal taking more time to be received at the network node than the first sounding reference signal.

7. The method of claim 1, wherein selecting the frame configuration for the communication through the relay node comprises selecting a configuration of uplink and downlink subframes in the frame configuration.

8. The method of claim 7, wherein selecting the configuration of the uplink and downlink subframes comprises selecting a frame configuration with more downlink subframes than uplink subframes.

9. The method of claim 7, wherein selecting the configuration of the uplink and downlink subframes comprises selecting a frame configuration with an equal number of downlink subframes and uplink subframes.

10. The method of claim 1, wherein the network node is a access node in communication with the relay node.

11. A processing node for assigning a frame configuration in a relay enabled communication network, the processing node comprising a processor that enables the processing node to perform operations comprising:
    determining a macro coverage latency between a wireless device and a network node when the wireless device is not communicating through a relay node, the macro coverage latency being based on a first sounding reference signal transmitted from the wireless device and received at the network node;
    determining a relay coverage latency between the wireless device and the network node when the wireless device is communicating through a relay node, the relay coverage latency being based on a second sounding reference signal transmitted from the wireless device and received at the network node via the relay node; and
    based on a comparison of the macro coverage latency and the relay coverage latency, selecting a frame configuration for a communication through the relay node.

12. The processing node of claim 11, wherein:
    the macro coverage latency is further based on a first average time between transmission of data packets from the network node directly to the wireless device and reception of acknowledgement of the transmission of the data packets, and
    the relay coverage latency is further based on a second average time between transmission of data packets from the network node to the wireless device via the relay node and reception of acknowledgement of the transmission of the data packets.

13. The processing node of claim 11, wherein the comparison of the macro coverage latency and the relay coverage latency comprises determining if the macro coverage latency is the same as the relay coverage latency.

14. The processing node of claim 13, wherein selecting the frame configuration comprises selecting a frame configuration that is the same as a frame configuration employed in a communication without the relay node.

15. The processing node of claim 11, wherein the comparison between the macro coverage latency and the relay coverage latency comprises determining if the relay coverage latency is higher than the macro coverage latency.

16. The processing node of claim 15, wherein the operations further comprise determining if the relay coverage latency is higher than the macro coverage latency due to the second sounding reference signal taking more time to be received at the network node than the first sounding reference signal.

17. The processing node of claim 11, wherein selecting the frame configuration for the communication through the relay node comprises selecting a configuration of uplink and downlink subframes in the frame configuration.

18. The processing node of claim 17, wherein selecting the configuration of the uplink and downlink subframes comprises selecting a frame configuration with more downlink subframes than uplink subframes.

19. The processing node of claim 17, wherein selecting the configuration of the uplink and downlink subframes comprises selecting a frame configuration with an equal number of downlink subframes and uplink subframes.

20. The processing node of claim 11, wherein the network node is a access node in communication with the relay node.

* * * * *